(12) United States Patent
Boyce et al.

(10) Patent No.: US 12,342,026 B2
(45) Date of Patent: Jun. 24, 2025

(54) COLLABORATIVE VIDEO CAPTURE AND SHARING

(71) Applicant: Vimmerse, Inc., San Jose, CA (US)

(72) Inventors: Jill M. Boyce, Portland, OR (US); Basel Salahieh, San Jose, CA (US)

(73) Assignee: VIMMERSE, INC., San Jose, CA (US)

( * ) Notice: Subject to any disclaimer, the term of this patent is extended or adjusted under 35 U.S.C. 154(b) by 0 days.

(21) Appl. No.: 18/417,403

(22) Filed: Jan. 19, 2024

(65) Prior Publication Data
US 2024/0205486 A1 Jun. 20, 2024

Related U.S. Application Data

(62) Division of application No. 17/981,312, filed on Nov. 4, 2022, now Pat. No. 11,917,232.

(60) Provisional application No. 63/277,072, filed on Nov. 8, 2021.

(51) Int. Cl.
*H04N 21/2743* (2011.01)
*H04N 21/258* (2011.01)
*H04N 21/278* (2011.01)

(52) U.S. Cl.
CPC ... *H04N 21/2743* (2013.01); *H04N 21/25875* (2013.01); *H04N 21/278* (2013.01)

(58) Field of Classification Search
CPC ............. H04N 21/2743; H04N 21/278; H04N 21/25875
See application file for complete search history.

(56) References Cited

U.S. PATENT DOCUMENTS

| | | | |
|---|---|---|---|
| 9,742,975 B2 | 8/2017 | O'Donnell et al. | |
| 9,769,332 B1 | 9/2017 | Delaunay et al. | |
| 10,581,782 B2* | 3/2020 | Tang | H04L 51/216 |
| 10,582,277 B2* | 3/2020 | Tang | H04N 21/632 |
| 11,153,442 B1 | 10/2021 | Balyasny et al. | |
| 11,245,947 B1 | 2/2022 | Sabo | |
| 11,481,236 B1 | 10/2022 | Weiss et al. | |
| 11,539,801 B1 | 12/2022 | Noskin et al. | |
| 11,743,444 B2 | 8/2023 | Faust et al. | |

(Continued)

OTHER PUBLICATIONS

Boyce et al., "MPEG Immersive Video Coding Standard", Mar. 10, 2021, Proceedings of the IEEE, (vol. 109, Issue 9, Sep. 2021).*

(Continued)

*Primary Examiner* — Douglas B Blair
(74) *Attorney, Agent, or Firm* — Loza & Loza, LLP; Gordon R. Lindeen, III

(57) ABSTRACT

Content hosting for composite video is described using metadata and user identification. A user management module registers a first user ID for a primary device, a second user ID for a secondary device, a session ID for a session between the primary device and the secondary device, and a player device with a third user ID and privileges to view a composite video. A content hosting module receives a first video associated with the first user ID and the session ID and a second video associated with the second user ID and the session ID. The first and second videos include metadata regarding time and position. The content hosting module serves a composite video to the player device in response to a request associated with the third user ID. A content preparation module forms the composite video using the first video and the second video.

20 Claims, 8 Drawing Sheets

(56) References Cited

U.S. PATENT DOCUMENTS

| | | | |
|---|---|---|---|
| 11,804,039 B2 | 10/2023 | Jorasch et al. | |
| 11,829,786 B2 | 11/2023 | Weiss et al. | |
| 2006/0174203 A1 | 8/2006 | Jung et al. | |
| 2012/0236103 A1* | 9/2012 | Cahill | G06Q 50/01 |
| | | | 348/14.01 |
| 2012/0263439 A1* | 10/2012 | Lassman | G11B 27/10 |
| | | | 386/E5.028 |
| 2013/0283319 A1 | 10/2013 | Marshall et al. | |
| 2014/0047074 A1* | 2/2014 | Chung | H04W 4/21 |
| | | | 709/219 |
| 2015/0043892 A1 | 2/2015 | Groman | |
| 2015/0317655 A1 | 11/2015 | Myers et al. | |
| 2016/0005135 A1* | 1/2016 | Bokestad | G06Q 30/0231 |
| | | | 705/319 |
| 2016/0006920 A1 | 1/2016 | Gomes Da Motta et al. | |
| 2016/0277802 A1* | 9/2016 | Bernstein | H04N 21/44213 |
| 2016/0286244 A1* | 9/2016 | Chang | H04N 21/4788 |
| 2018/0098134 A1 | 4/2018 | Sufuentes et al. | |
| 2018/0152736 A1* | 5/2018 | Alexander | H04N 21/6587 |
| 2018/0342329 A1 | 11/2018 | Rufo et al. | |
| 2019/0289253 A1 | 9/2019 | Curio | |
| 2020/0137354 A1 | 4/2020 | Nathan et al. | |
| 2020/0268471 A1 | 8/2020 | Kajita | |
| 2021/0303075 A1 | 9/2021 | Cowburn et al. | |
| 2021/0374391 A1 | 12/2021 | Jorasch et al. | |
| 2024/0335739 A1* | 10/2024 | Paradise | A63F 13/497 |

OTHER PUBLICATIONS

Nemcic et al., "Multiview Video Coding Extension of the H.264/AVC Standard", Sep. 15-17, 2010, Proceedings ELMAR-2010.*

Hannuksela et al., "Overview of the Multiview High Efficiency Video Coding (MV-HEVC) Standard", Sep. 27-30, 2015, 2015 IEEE International Conference on Image Processing (ICIP).*

* cited by examiner ns herein.

COLLABORATIVE VIDEO CAPTURE AND SHARING

CROSS-REFERENCE TO RELATED APPLICATIONS

The present application claims the priority and the benefit of U.S. Provisional Patent Application Ser. No. 63/277,072 filed Nov. 8, 2021 by Jill M. Boyce et al, entitled COLLABORATIVE VIDEO CAPTURE AND SHARING, and U.S. patent application Ser. No. 17/981,312 filed Nov. 4, 2022 by Jill M. Boyce et al, entitled COLLABORATIVE VIDEO CAPTURE AND SHARING, the entire contents of which are incorporated herein by reference as if fully set forth below in its entirety and for all applicable purposes.

FIELD

The present disclosure relates to the field of video and, in particular, to collaborative video capture and sharing.

BACKGROUND

Traditional multiple camera movie capture places multiple cameras in different locations to each capture a different view of the same scene. A clapperboard is placed in the scene at the start of each take to give a common visual and audio time point reference to each camera's take. After the scene is captured, the multiple views are collected and sent to post-production for editing and combination and to produce the combination intended by the producer. The synchronization of the videos is very simple, but the later editing is not.

With some volumetric video capture systems, a studio performs video capture using many cameras, that are wired together, with generator locking (genlock) to align the frame captures of each camera. The camera positions are limited by the wired connections and each camera must be configured to synchronize with the genlock signal. The collection and combining of the video are similar to that for traditional movie capture.

BRIEF DESCRIPTION OF THE DRAWING FIGURES

The invention may best be understood by referring to the following description and accompanying drawings that are used to illustrate embodiments of the invention.

DETAILED DESCRIPTION

Wireless interfaces may be used to quickly create and modify an array of multiple cameras as an impromptu or ad hoc session. A session allows collaborative multi-view capture to be performed using the cameras in the session. The content can be uploaded to a central location, prepared, and shared for playback with those in the session and with others. Sessions may be used to provide an association between capture sessions, users, and devices. Content can be formed which combines captures from the multiple devices. Having information about the sessions, users, and devices provides benefits for preparation and viewing of the content, and can be used to identify which users and devices contributed to the combined content. The captures may be augmented with metadata that is uploaded and available at the central location. The metadata may be used to allow each user to develop a unique arrangement and sequence of views for a unique immersive experience of the video captures. In some embodiments, a user may use the different video captures to create a virtual reality experience of moving from one view to another.

Many digital video cameras include wireless communication interfaces to allow the camera to communicate with remote data storage, with camera controllers, and with other cameras. Some such wireless communication interfaces, such as Wi-Fi and cellular radio can be used for timing and location information as well. Smartphones and electronic cameras may also have satellite positioning receivers that provide precise absolute timing and the position of the camera to determine relative position. Beyond these radio interfaces, some cameras are also able to determine the orientation and optionally the position of the lens or lenses using gyroscopes, accelerometers, attitude, and orientation sensors to record the taking characteristics of the camera such as focal length, focus distance, shutter speeds, and various other setting. While these features are well-known for smartphones, amateur and professional video cameras also offer these features integrated into the system or as accessories. With all of these radio interfaces and detectors, a video camera can determine its precise orientation and position. It can coordinate the time of its video capture with other cameras and it can upload the captured video to another camera or to the remote data storage. All of this information provides richer metadata about the video than does the clapperboard. Some cameras also use multiple lens systems to determine the distance or depth of different objects in the video and for a variety of other computational photography effects.

Figure 1:
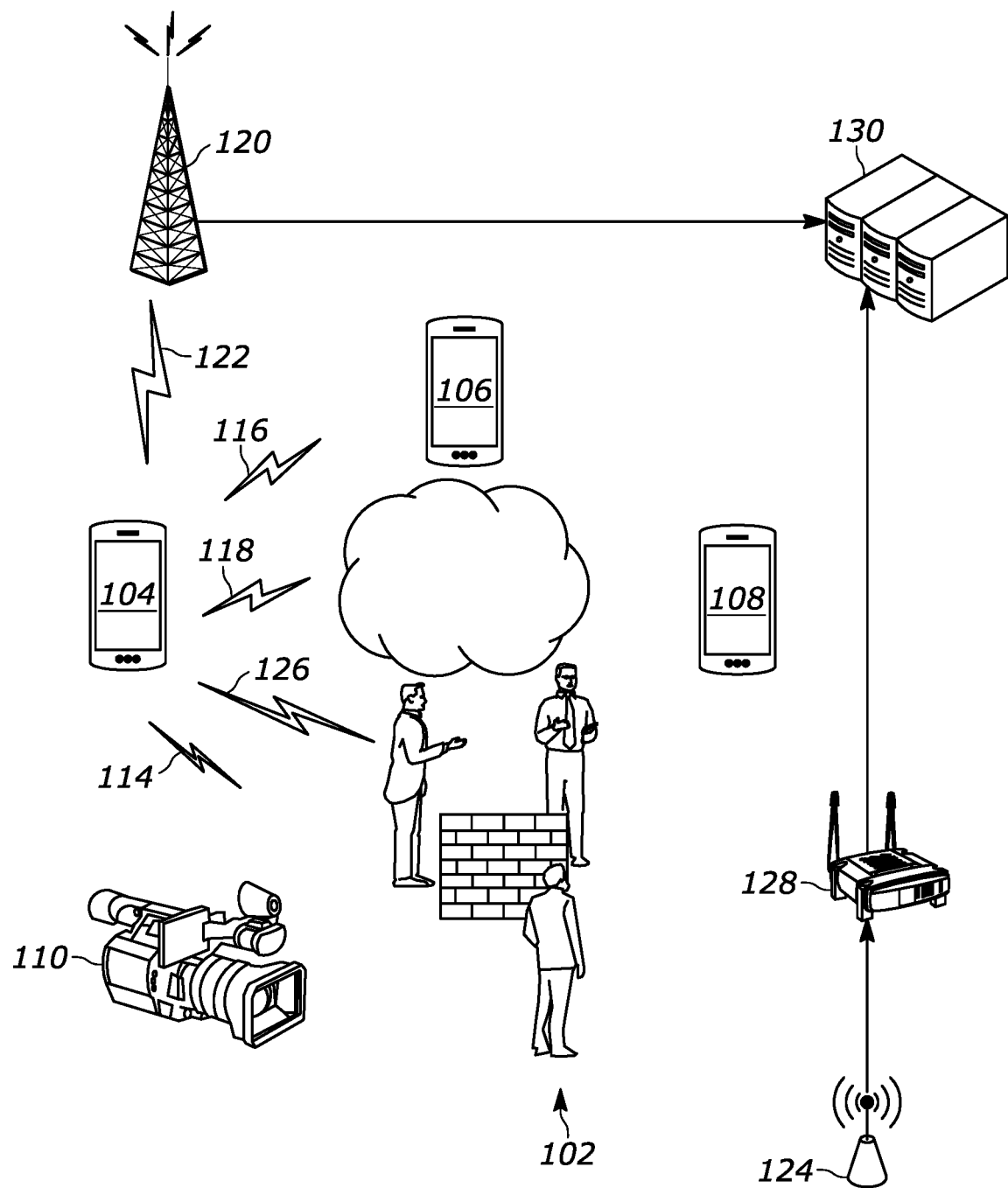
FIG. 1 is a diagram of capturing a video scene using multiple cameras according to embodiments herein.

FIG. 1 is a diagram of capturing a video scene using multiple cameras according to embodiments. A scene 102 is shown as having three people beside a short brick wall, under a cloud. A primary camera 104 is in a first position with a view of the scene. A second camera 106 is in a second position with a second view of the scene. A third camera 108 is in a third position with a third view of the scene and a fourth camera 110 is in a fourth position with a fourth view of the scene 102.

The primary camera 104 has a communication link 116 with the second camera, a communication link 118 with the third camera 108, and a communication link 114 with the fourth camera. The primary camera 104 may also have a communication link 122 with a cellular radio system 120 and a communication link 126 with a wireless access point 124. The wireless access point provides a connection through a router 128 to a remote data store 130. The cellular network 120 may also offer a connection to the remote data store 130. The remote data store may provide only storage or it may be or be connected to a server with a wide variety of different user services as discussed in more detail below.

For simplicity, the illustrated wireless connections are only between the primary camera and each other device. However, each other device may also be capable of communication with one or more of the devices in addition to the primary camera. In addition, the designation of one camera as primary is only for purposes of operation during a video capture session. The primary camera may be more or less fully equipped and featured than the other cameras and a different camera may be the primary camera for another video capture session. The cameras are shown as smartphones 104, 106, 108 and a compact camera or action camera 110, however more and other types of cameras may be used. Smartphones provide an easily programmable user interface with rich computational photography features but other types of amateur and professional cameras may be used instead or in addition to those shown. The cameras may be hand held or mounted in any suitable way. The cameras may be fixed in position or movable, to suit particular scenes.

In some embodiments, the cameras 104, 106, 108, 110 communicate with each other using a short range personal area network (PAN) such as Bluetooth, Ad hoc Wi-Fi, or Wi-Fi Direct. Any other suitable short range communications system may be used. In some embodiments, one or more the cameras 104, 106, 108, 110 are coupled to the Wi-Fi Access Point 124 in a local area network (LAN) or wide area network (WAN) to communicate with each other through the network. In some embodiments, one or more of the cameras 104, 106, 108, 110 are coupled to each other through the cellular network 120. The wireless connections may take any a variety of different forms to suit the nature of the video capture and the natures of the cameras. In addition, one or more of the connections may be wired.

As described herein, video capture sessions and capture takes can be initiated by a camera that is established as the primary device for the session. Each camera can be linked to a User ID. The camera joins the session with the primary device and uploads its video capture files to a server. At the server 130, content from multiple captures is combined into a single composite content. Metadata is associated with the composite content that identifies all of the users who contributed captures, and their role as primary or secondary device. Combined content and metadata are delivered to viewers. Playback devices have video display capability and may optionally have motion sensors. In some embodiments, capture devices, such as tablets or smartphones can also be used for playback. Depth capture can be enabled on phones using ARCore on Android devices or ARKit on iOS devices. Multiple cameras may be supported on the same device.

Ad hoc groupings may be used to establish a session. Secondary cameras are slaved to a primary camera for the session. Each camera takes its video under the control of the primary and then independently uploads its video files to the server. In some embodiments, each secondary camera signs up or registers with the server and agrees to participate in capture sessions with particular other cameras. Alternatively, only the primary camera is registered with the server. The secondary camera is then able to join a session started by a primary camera. As described herein, a set of identification information allows each session and each participant to be sorted and organized for later use. This identification information includes a Session ID, a Take ID, a Device ID, a User ID, and file metadata.

Figure 2:
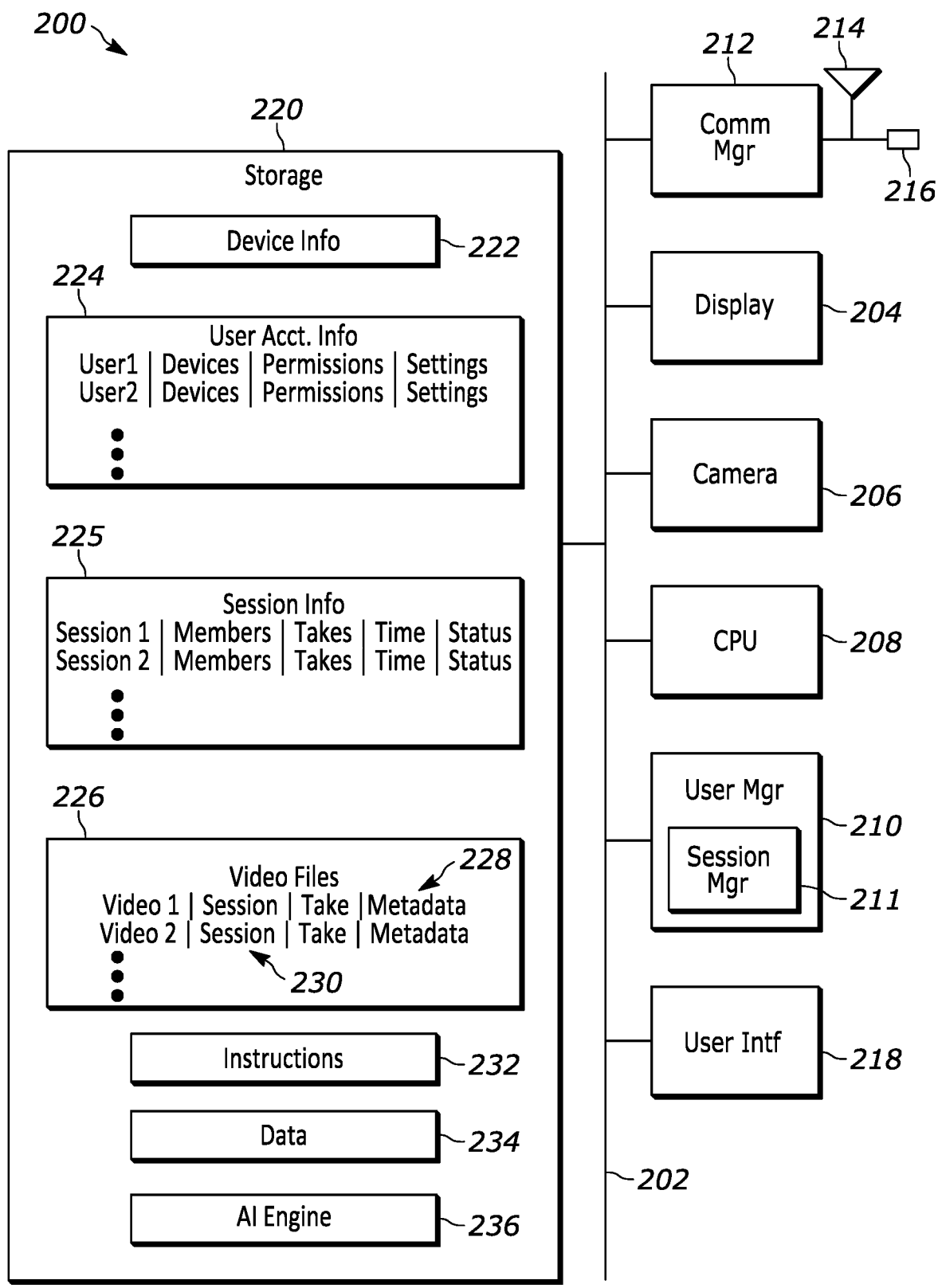
FIG. 2 is a simplified diagram of an example camera or capture device suitable for use as the primary device or as a secondary device according to embodiments herein.

FIG. 2 is a simplified diagram of an example camera or capture device 200 suitable for use as the primary device or as a secondary device. The camera may include a display 204, a camera sensor 206, a processor 208 or central processing unit (CPU), a user manager, 210 including a session manager 211, and a communications manager 212 with a wireless interface through antennas 214 and a wired port 216, coupled together by one or more data buses 202. The capture device 200 may also include a user interface module 218 and a storage device 220. Any one or more of these components may be removed or combined with other components. More components may be added to suit particular implementations. The primary device may or may not include the camera sensor or may elect not to use the camera sensor. In any of the devices in the session, some or all of a device's components may be disabled or unused.

The display 204 may have one or more parts using one or more different technologies. touch control overlays, cursors or both may be used to connect with the user interface module 218 as may be appropriate. The display may provide video playback, live view, controls, and other functionalities. For example, graphical and textual indications of installation status, operations status, schema configurations, and other information may be presented to the user on the display device. Typically, an alphanumeric input device, such as a keyboard with alphanumeric, function and other keys, may be part of the user interface 218 and coupled to the bus for communicating information and command selections to the processor. A cursor control input device, such as a mouse, a trackball, trackpad, or cursor direction keys can be coupled to the bus for communicating direction information and command selections to the processor and to control cursor movement on the display.

The camera 206 or camera sensor may have one or more image sensors and one or more lens systems. Additional types of sensors, such as infrared, depth, LIDAR, etc. may also be used. The image sensor may include control circuitry to control frame rates, capture times and optical controls. The image sensor may also include an image pre-processor to prepare captured images for use by other parts of the capture device. In some embodiments, the camera sensor includes a lighting system for illuminating the scene. In other embodiments, an external lighting system may be attached to the capture device or provided.

The processor 208 may be a central processing unit, a microcontroller, or a combination of processing components, including graphics processing, image processing, video compression, video conversion and other components. Special purpose, general purpose, or a combination of different types of processing components may be used. In some embodiments, the processor has multiple cores that are specialized for particular functions. The processor may be implemented on one or more dies using one or more technologies. The processor may be augmented with co-processors and memory which may be in a single die or as multiple dies in a single package or as multiple packages.

The user manager 210 logs users into the device for access to features of the device including video capture and video play. The users are logged in with a user ID or other suitable identifier. The user manager allows access to the features and permissions associated with the currently logged in user ID. The session manager 211 manages sessions between the capture device and the server and between the capture device and other devices for any and all communications.

The user manager 210 maintains user account information 224 in the storage 220. The user account information includes any registered user ID linked to attributes of the user, devices of the user, such as by device ID, permissions, and unique settings. The session manager 211 tracks session information 225 in the attached storage 220. The session information 225 may include the members of each session, the takes and take ID for each session, times, and status of the session. The session status, session members and any other details of a session as stored may be described as including any session ID linked to attributes of the session, such as status, time, members, such as by user ID, and actions taken during the session, such as video captures, takes, uploads, downloads, etc.

The communications manager may include any of the wireless interfaces discussed above, such as Bluetooth, Wi-Fi, cellular, etc. for a PAN, LAN, or WAN that communicate through one or more antennas 214 to the bus 202. The communications manager may also support wired interfaces through a wired port 216 including network interfaces, such as Ethernet, and point-to-point interfaces, such as universal serial bus (USB), Thunderbolt, and various advanced forms of small computer system interface (SCSI), etc. The user interface may use touch, haptic, and audio interfaces, voice control, touch control, and keypads. The user interface module 218 may operate with one or more of the displays 204 and with other controllers including accessory attachable controllers.

The storage 220 may be used for instructions 232 and data 234 and may be solid state, magnetic, flash, or a combination of different types in different physical configurations, such as removable cards, surface mount chips, and other configurations. The storage is shown as including device information 222, user account information 224, session information 225, video files 226, and other data. The video files may include metadata 228, and session data 230 among others. The metadata may include time, orientation, and other characteristics of the capture corresponding to the respective video file. In some embodiments EXIF (Exchangeable Image File) data or similar types of data may be included in the metadata. The video files are linked to a take ID and to the device ID and user ID through the session information including a session ID. In the event that the device is a smartphone, the storage may include many other types of data for other functions of the device.

The capture device and server systems described herein may further include an AI (Artificial Intelligence) engine 236. This may be implemented in dedicated hardware using parallel processing or in the processor or using some combination of resources. The AI engine may also be external to the computer system and connected through a network node or some other means. The AI engine may be configured to use historical data accumulated by the capture device or server or another system to build a model that includes weights and criteria to apply to the selection processes, operations, and encryption among others. The model may be repeatedly rebuilt using the accumulated data to refine and increase accuracy.

The capture device may include cache memory, such as a random access memory (RAM) or other dynamic data storage device, coupled to the bus for storing information and instructions to be executed by the processor. The storage 220 also may be used for storing temporary variables or other intermediate information during execution of instructions by the processor. The storage may also include a main nonvolatile memory, such as a read only memory (ROM) or other static data storage device coupled to the bus for storing static information and instructions for the processor.

As shown in FIG. 1, the system may include a server or multiple servers to receive the captured video and then serve it to appropriate users.

Figure 3:
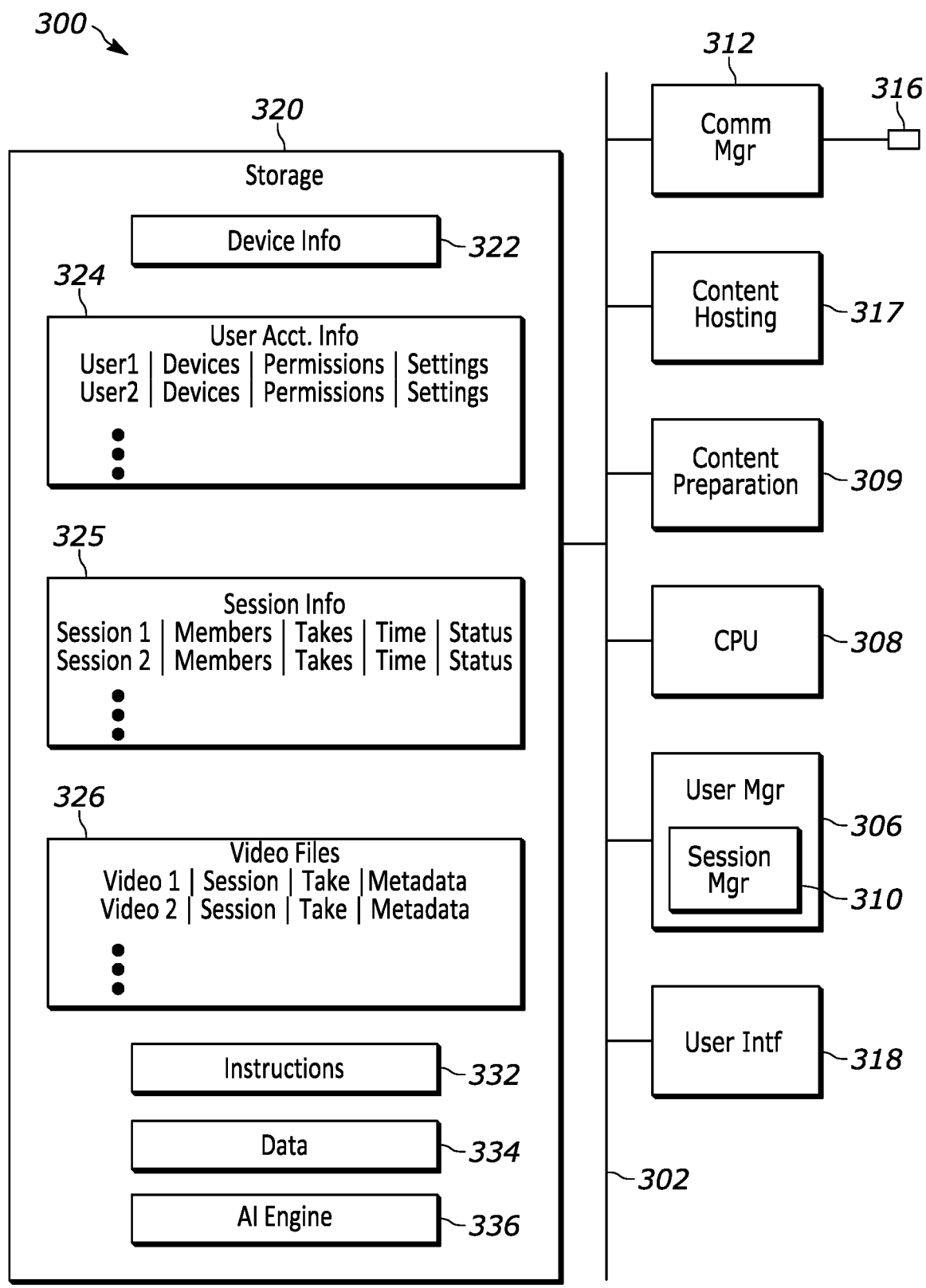
FIG. 3 is a simplified diagram of an example server suitable for use with the video capture, compositing, and serving processes described herein.

FIG. 3 is a simplified diagram of an example server suitable for use with the video capture, compositing, and serving processes described herein. The server may include a user manager 306, or user management module, that includes, or is connected to, a session manager 310, a processor 308 that includes or is associated with a content preparation module 309, and a communications manager 312 with a wide area network interface 316, that includes or is associated with a content hosting module 317. Alternatively, for local use, a local area network or other small scale interface may be used. These components are coupled together by one or more data buses 302. The server 300 may also include a user interface module 318 and a storage device 320. Any one or more of these components may be removed or combined with other components. More components may be added to suit particular implementations. Some or all of the device's components may be disabled or unused or enabled in other hardware that is connected as separate hardware. In some embodiments, the server is implemented using virtual resources in a cloud-based computing system.

The user interface module 318 may have one or more parts using one or more different technologies. The server may be headless for remote access or it may offer any of a variety of displays, touch control overlays, cursors, or keyboards, etc. The processor 308 may be a central processing unit, a microcontroller, or a combination of processing components, including graphics processing, image processing, video compression, video conversion and other components. Special purpose, general purpose, or a combination of different types of processing components may be used. The session manager 310 manages sessions between the various devices and the server for any and all communications. The session manager tracks session status, session members and any other details of a session. It maintains the lists of user IDs, permissions, associations, settings, sessions, takes and other pertinent data.

The user manager 306 or user management service provides registration, status, and tracks user accounts and devices for use in any of the sessions. The user management service, allows users to sign up for services and be assigned a unique User ID, not shared by other users of the service. Optionally, other information can be associated with the User ID, such as a User Name, which may not be required to be unique.

The storage 320 may be used for instructions and data and may be solid state, magnetic, optical, flash, or a combination of different types in different physical configuration, such as removable cards, surface mount chips, and other configurations. The storage is shown as including device information 322, user account information 324, session information 325, video files 326, instructions 332 and other data 334 for use by the server.

The user account information 324 may have information about all registered users and any participating users that are not registered including devices of the user, permissions of the user including permissions to upload and view video files and any settings and preferences. The session information 325 may include members of each session, takes during the session, the time of the session and the current status including any actions. The video files 326 may include the session data, take IDs, and metadata, among other data about the video file.

The capture device and server systems described herein may further include an AI (Artificial Intelligence) engine 336. This may be implemented in dedicated hardware using parallel processing or in the processor or using some combination of resources. The AI engine may also be external to the computer system and connected through a network node or some other means. The AI engine may be configured to use historical data accumulated by the capture device or server or another system to build a model that includes weights and criteria to apply to the selection processes, operations, and encryption among others. The model may be repeatedly rebuilt using the accumulated data to refine and increase accuracy.

A lesser or more equipped capture device or server system than the examples described above may be preferred for certain implementations. Therefore, the configuration of the exemplary devices and server will vary from implementation to implementation depending upon numerous factors, such as price constraints, performance requirements, technological improvements, or other circumstances. The computer system may be duplicated in different locations for distributed computing. As an example, the system may use a simple pre-programmed deterministic selection model instead of an AI model and the AI engine.

When participating in a capture session, identified by a Session ID, each capture device, identified by a Device ID, is associated with an individual user, identified by a User ID. This association could be determined upon initiation of the capture session or in advance of the capture session, and involves communication between the capture device and the user management service on the server. The user, e.g., User1 can login to the service on the device, e.g., Device1, through a dedicated app or a webpage on the device, or through other means. At the time of the association of the user with the capture device, a communication connection between the capture device and the server hosting the service may be used. Or the device may be connected through another device. Once connected, that association may persist when communication between the device, Device1, and the server is not available. As an example, a phone can be registered to the user and the server when the phone is active and connected on-line through Wi-Fi or cellular. Then when the phone goes outside of a service range, the association is still valid.

The User ID associated with the device can be changed at any time. This allows another person to login to the service on the device. Explicit logout and login may be required or the most recent user may be the one that is associated. In some embodiments, a smartphone has a single user account for a variety of smart device purposes. The user may use that single user account or different accounts may be used for video capture purposes. In addition, more than one capture device may be associated with the same User ID, e.g. the user can login with the same User ID on more than one capture device.

Capture Session

A capture session is initiated on a primary device, which may also be one of the capture devices. The User ID associated with the primary device is designated the primary capture user. Other capture devices that join the capture session are designated as secondary devices. The number of secondary devices may vary, and a capture session does not require any secondary devices. If the User IDs associated with a secondary device differ from that of the primary device, the other User ID may be designated as secondary capture users.

During the capture session, communication between the primary and the secondary devices is used. However, there is no immediate need for any of the capture devices to communicate with the server. The video captures may be uploaded later when connectivity becomes available or convenient. The communications interface of each device may search for a suitable connection to the remote data store, such as an Internet connection. When a connection becomes available then the device uploads its takes using the connection. This allows video to be captured as takes without requiring a connection to the server. The nature of the connection depends on the location of the remote data store and connections to it.

Methods to Join the Capture Session

Different methods may be used for secondary devices to join the capture session. One method is that invitations are issued by the primary device to nearby other devices also actively using the service. The primary device may be informed about other devices by the server or the primary device may send an advertisement requesting that any devices in range join a session. In some embodiments, the primary device has a capture application or app installed in its storage and the capture app generates invitations in a form that is suitable for other devices that are also using the capture app. The invitation to join the capture session can be accepted by the secondary device. Alternatively, a primary device may advertise that a capture session is active and a secondary device may send a request to join the active capture session, which may be accepted by the primary device. Invitations, requests, and acceptances can be sent using a communication connection available between the primary and secondary devices. Optionally, a server may be involved in the communication between devices during session initiation. Invitations, requests, and acceptances may require active involvement of the user of the devices, or may be automated through rules. Invitations, requests, and acceptances may depend upon prior identified relationships between the users, such as the users being connected through the user management service's social network, or one user following another user. For example, requests to join a session may be limited to devices operating by users connected to the primary user, or invitations may be automatically accepted on additional devices that are also operated by the primary user.

During a capture session, each capture device is also associated with its assigned Device ID. The Device ID could have been determined in advance of the session, perhaps by a name assigned to the device by the end user or by another identifier of the device, such as a phone number or an IMEI (International Mobile Equipment Identity). Alternatively, the primary device may define and assign a Device ID to each secondary device. Device IDs should be unique to each device in a single capture session, but do not need to be unique among all devices using the service or for devices in other capture sessions.

A Session ID is associated with each capture session. The Session ID may be determined by the primary device upon initiation of a capture session, or may be determined by the server upon submission of the session to the server by the primary device. Submission of the session to the server may occur prior to any capture takes occurring or may occur following capture takes. For live streaming, the submission of the session to the server prior to capture is required. For pre-recorded content, submission of the session to the server can occur after the capture takes, prior to the uploading of capture files or as part of the upload process.

Capture Session Process

A capture session may involve several takes, during which video capture is performed. During a capture session, the primary device initiates capture of a take, having a Take ID. A user may begin the take, for example using a button on an app or webpage, or via a remotely activated trigger, or activated via voice or gesture. The take may be started by a timer, a motion sensor, the detection of an object entering the scene or in other ways. A Take ID is used to identify the take, which could be an incrementing number. When capture of a take is initiated, the primary device sends a message containing a take capture start command to the secondary devices, using a communication connection. This command message can contain the Session ID and Take ID associated with the session and the take. Alternatively, instead of sending a Take ID in the command message, each device can increment a take number locally. When a secondary device receives the take capture start command message, video capture is initiated on the cameras of those devices. The exact start time of the capture may be briefly delayed to enable synchronization of the capture devices. The primary device also initiates video capture on its camera.

The captured video may be stored in local files in each device, or when a communication connection is available, may be uploaded to remote storage or streamed to the server hosting the service, and this selection can be communicated by the primary device to the secondary devices. The captured video may utilize video compression, such as the MPEG (Motion Picture Experts Group) AVC (Advanced Video Coding), HEVC (High Efficiency Video Coding), or VVC (Versatile Video Coding) standards.

Audio may also optionally be captured by the primary and/or secondary devices, either within the same file or stream as the video or in a separate file or stream. Depth data may also optionally be captured by the devices, such as is made available by ARCore on Android phones or ARKit on iOS devices (iPhones, iPads). Depth of objects from the image sensor may be determined by LiDAR and/or time of flight sensors. Computer vision and/or machine learning techniques on the capture devices can be used to generate depth. Depth may be represented in different formats, such as normalized disparity. Audio compression can be applied to the captured audio, and video compression can be applied to the capture depth. Similar to the captured video, the audio and/or depth captured by the devices may either be stored locally on the devices, or may be uploaded or streamed to the server during the capture process.

The primary device determines when to stop the capture of a take, using similar methods to those available for starting capture. When a take capture is stopped, the primary device sends a stop command to the secondary devices. When the secondary devices receive the stop command, video (and optionally audio and/or depth) capture is stopped on the device.

When a secondary device receives command messages from the primary device, it may send an acknowledgement message to the primary device. If the acknowledgment message is not received by the primary device, it may repeat the sending of the command message. If the communication connection is lost between the primary and secondary devices, an alternative method can be used for determination of when a second device stops recording, such as using a maximum recording time.

A session may involve multiple takes. Additional takes may be captured for the session, by repeating the take start command and stop command and related steps described above. In some embodiments, preview videos or image data may be sent from the secondary devices to the primary device. This may allow the primary device user to determine if the secondary device video is useful and if another take may be desired.

Figure 4:
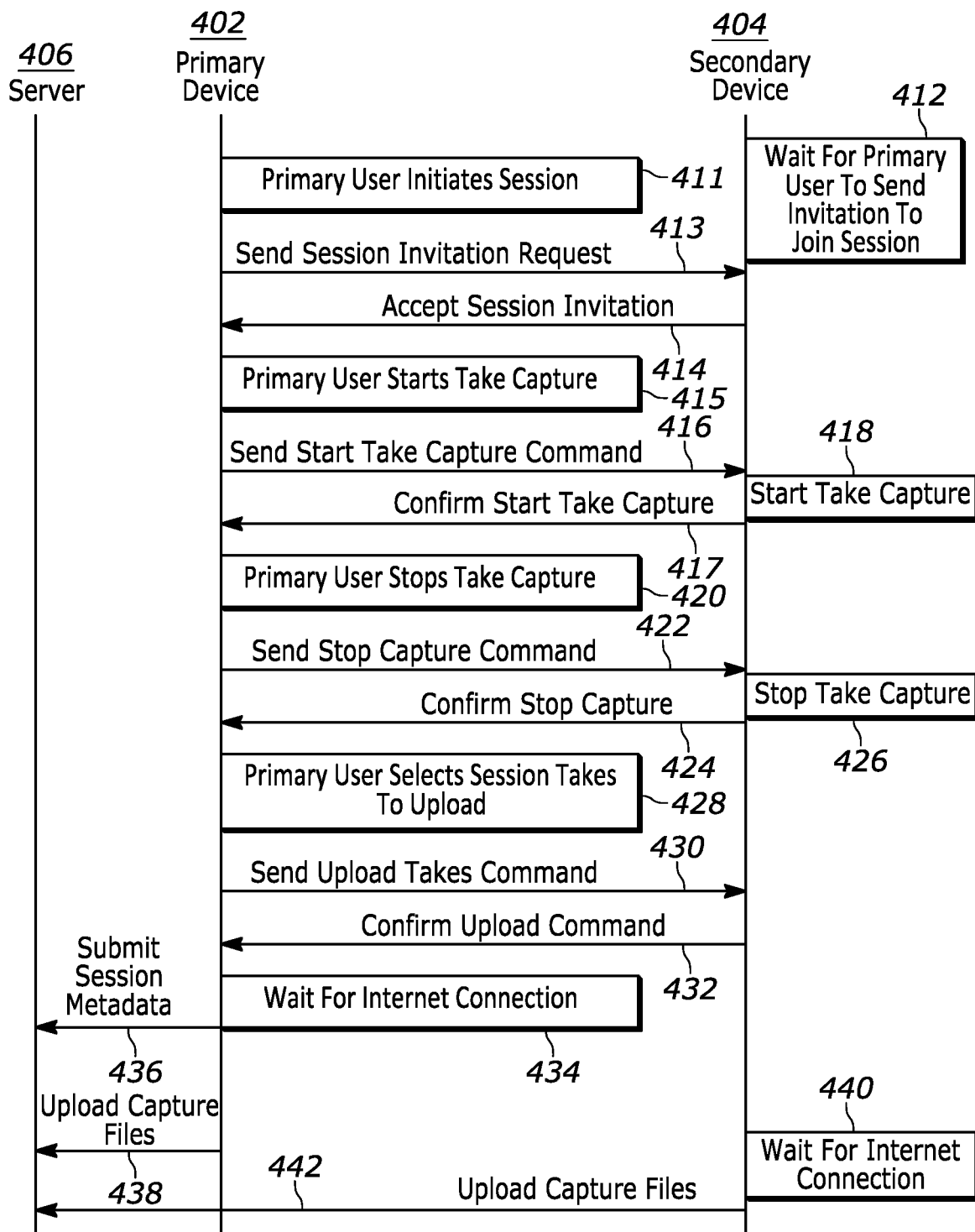
FIG. 4 is a signaling diagram of an example operation of a take as conducted by the primary device with the secondary device and server according to embodiments herein.

FIG. 4 is a signaling diagram of an example operation of a take as conducted by the primary device with the secondary device and server. A primary device 402 is in communication with a secondary device 404 through any suitable wired or wireless interface, such as Wi-Fi Direct. The two devices 402, 404 are also in communication with a server 406 to store video captures but not necessarily at the same time and in the same way. At 411, a primary user, operating the primary device initiates a session. Through an app, web interface, or other facility on the primary device, the primary user causes the primary device to send a session invitation request at 413. The request may be made to a particular device or to many different devices such as those that are registered as being connected with or following the primary user. At the same time, the secondary device is waiting for the primary user to send an invitation to join a session at 412. When the secondary device receives the invitation at 413, then it is able to accept the session invitation at 414. More devices may be added to suit the planned takes for the session.

The primary user then starts a take capture at 415. The primary user causes the primary device to send a start take capture command at 416. The secondary device receives the start take capture command 416 and starts a take capture at 418. The secondary device also sends a confirm start take capture at 416. If the primary device does not receive the confirmation, then it may send another command or test the communication link in another way to ensure that the secondary device is still accessible and available.

At 420, the primary user stops the take or video capture. The primary user causes the primary device to send a stop command at 422. The stop command causes the secondary device to stop its capture or take at 426 and send a confirm stop back to the primary device at 424. If the primary device does not receive the confirmation, then it may repeat sending the stop command.

The takes are then uploaded. At 428, the primary user reviews the takes and decides which takes captured during the session are to be uploaded. The selection of takes is then sent to the secondary device as sending an upload takes command 430. At 432, the secondary device sends an upload command confirmation. The command may be as simple as a list of take ID values or it may be formatted in other ways.

After the upload takes are decided, then the primary device waits for a suitable connection to the server at 434. In some embodiments, the connection is an Internet connection to a remote server. The connection may be established during the takes, before the takes, or after the takes and may be established immediately or after the passage of some time. After the connection is established, then the primary device sends the session metadata to the server at 436 and sends the uploaded capture files to the server at 438. The capture files may be only files captured by the primary device or may include capture files from another device that were acquired by the primary device. In a similar way, the secondary device waits for an Internet connection, or other connection, with the server at 440 and then uploads capture files to the server at 442.

Server Operation

The primary device communicates information to the server about the users and devices included in the capture session, such as the number of devices, for each device, the Device ID, the User ID, a list of Take IDs, and an indication if audio and/or depth information is present and if it is stored in the same file or stream or separately. The server can use this information to determine if and when all expected files for the session have been uploaded successfully. The primary device may also send a user-defined name of the session, a creation time of the session, name, and model identification information for each capture device in the session and other data.

Metadata related to each device's capture is associated with the video/audio/depth capture file or stream, which may contain such information as User ID, Device ID, Session ID, Take ID, primary/secondary device indication, type of data (video, audio, depth) included, time at which the capture was started and stopped, latency with respect to the primary device, capture duration, model information of the device, gyroscope parameters such as position and orientation, camera parameters such as focal length and focal point, and parameters describing the format of the stored depth, including minimum and maximum values and precision. Some of the metadata components may be used in the determination of the file name, and/or the metadata may be embedded within the file containing the video and/or audio and/or depth, or may be included in an additional file, or other methods of association.

When captures are stored to local files on the devices, the upload of the capture files from each device may be initiated in a variety of different ways. In some embodiments, the user operating the primary device initiates the upload by sending an upload command message to all of the secondary devices, which may contain information including the Session ID and a list of Take IDs to be uploaded. Sending the upload command requires a communication connection between the devices, but does not require a connection to the server. When a secondary device receives the upload command messages, it can send an acknowledgement message to the primary device. If the acknowledgment message is not received by the primary device, it may repeat the sending of the command message. If the communication connection is lost between the primary and secondary devices, an alternative method can be used for determination of if and when the secondary device will upload the content. The upload may also be initiated upon receiving the stop command, upon expiration of a time, upon coming within range of a Wi-Fi access point, or upon other circumstances. A device can wait until a communication connection to the server becomes available to upload the files, for example when the device reaches cellular service range or Wi-Fi access range.

After a secondary device receives the upload command message, it uploads its capture files to the server, along with the metadata associated with the capture files, which may be part of the capture file and/or sent separately, for example by writing to a database on the server. It may also provide capture file size and/or a hash of the capture file info to enable the server to determine if the file is completely and correctly uploaded.

A content preparation service on the server can process the available uploaded capture files to form combined content that combines content from multiple devices. For example, a composite video, or a multi-view video, or immersive video may be formed. A composite video refers to a video in which a region of the picture contains an input video and a second region of the picture contains a second input video. Multi-view video may use a multi-view coding standard such as the MVC extension to the AVC standard, or the MV-HEVC or 3D-HEVC extensions to the HEVC standard, in which the first input video is coded in pictures of a base layer, and the second input video is coded in pictures of another layer, possibly predicted from the base layer pictures. Immersive video may use the MPEG Immersive Video (MIV) coding standard, which is used to code multiple input videos of a 3D scene and camera parameters associated with each input video, and optionally associated depth or disparity representations of each input source, using patches and atlases. Immersive video allows a user operating a player device to navigate playback of the 3D scene with 6 degrees of freedom (DoF) of position and orientation. Motion sensors in the player device may be used to navigate views and perspectives. Keypads may be used to select display options.

In the combined content, audio may be combined from multiple users, to form spatial audio, or a single audio source can be used, i.e., from the primary device. Additional information, including text overlays, can be included in the combined content. Information about the users and devices who participated in the capture session are associated with the combined content.

Figure 5:
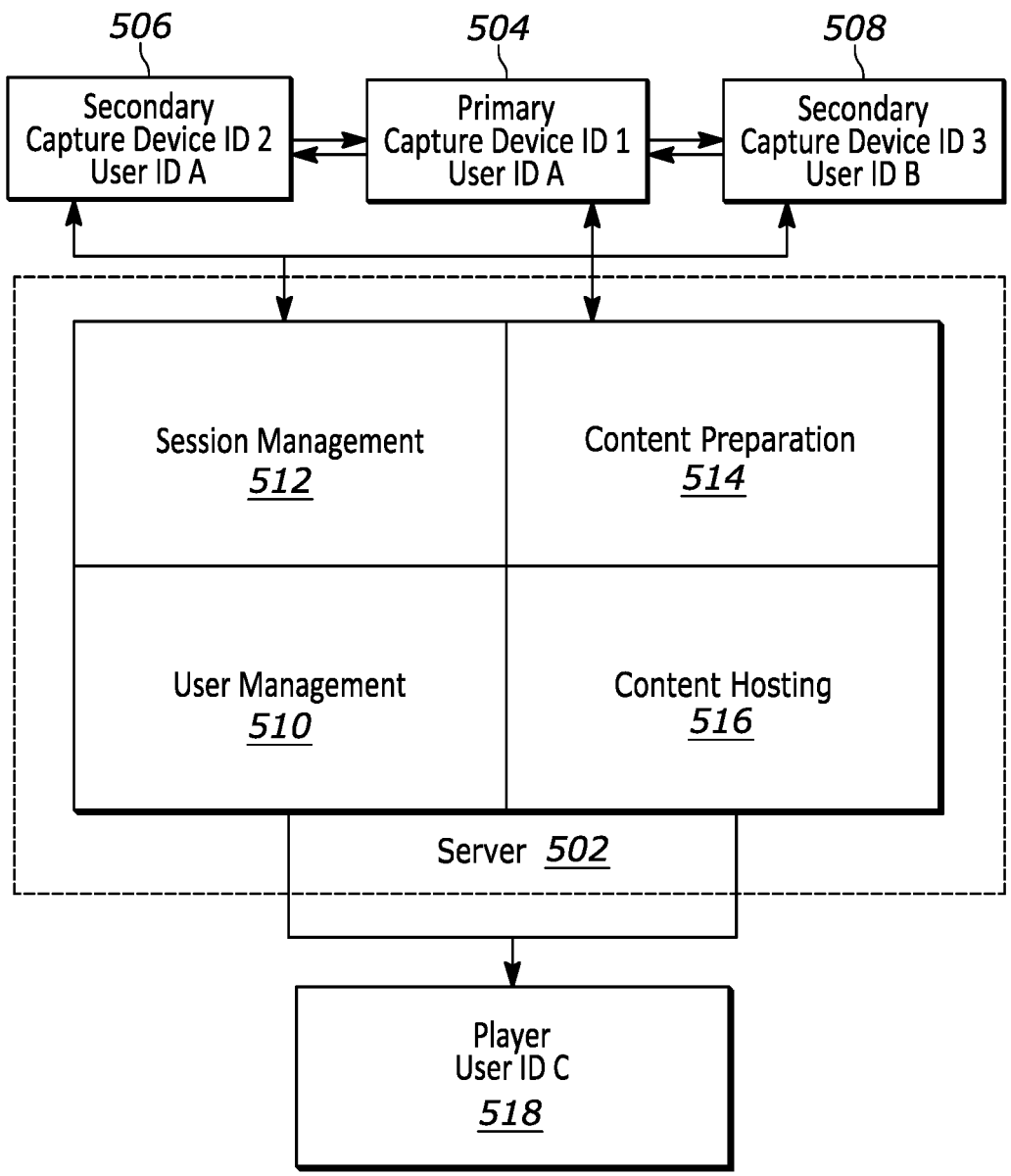
FIG. 5 is a block diagram of components and interactions for uploading and hosting content according to embodiments herein.

FIG. 5 is a block diagram of components and interactions for uploading and hosting content according to embodiments herein. For uploading content, capture devices are used. A primary capture device 504 has a device ID 1 and is accessed via a user ID A. A second capture device 506 is a first secondary device and has a device ID 2. User ID A is also logged in to the first secondary device. Typically, this suggests that a single person owns and controls both the first and the second capture device. A third capture device 508 is shown as a second secondary device with device ID 3 and logged in user ID B. This represents a device that someone else owns, however, a single person may have more than one user ID. The capture devices 504, 506, 508 are each in communication with one or more other capture devices for forming sessions, and for starting and stopping video captures also referred to herein as takes. There may be more or fewer capture devices. Three are provided only as an example.

As mentioned above, the primary device, with device ID 1, forms a session by sending an invitation or advertisement to the secondary devices with a session ID. The secondary devices join the session by sending back the session ID and a session manager at each capture device tracks the session status. The primary device 504 may be the same as the secondary devices 506, 508 except for being primary for forming the session. Any of the other devices may also become a primary device and start a session. With the session established, the primary device 504 causes the secondary device to begin takes and stop takes and then reports the session ID and identifies the takes and participating secondary devices to a server 502.

The server 502 includes a user management module 510 to track all the registered users by user ID, such as user ID A, user ID B, user ID C, as shown in FIG. 5. The user management module tracks all the privileges and associations of each user. In this example, the user with user ID A has a privilege of forming sessions and uploading information about sessions, session members and takes to the server. The user with user ID C has privileges to view video from the uploads from the user with user ID A. The users with user ID A and B may also have privileges to the view those videos and to upload their own session information. The server includes a session management module 512 to receive the session information from the primary device and receives the video captures or takes from the three capture devices 504, 506, 508. The server knows when all of the takes are uploaded based on the session information received from the primary device 504.

The server also has a content preparation module 514 to operate on the takes of the session. This content preparation may be as simple as sorting and associating all of the takes for ready access by others. A composite video or immersive video or other types of videos may also be prepared. The server also has a content hosting module 516. This module accesses the takes in a chosen form for ready access and use by others. The content may be organized by session ID, by Take ID, by capturing device ID. The content may also be associated with other flags and identifiers.

A player 518 device, identified with user ID C is a consumption device. While only one is shown there may be many more. This device may be the same as or different from one of the capture devices 504, 506, 508. It may be in the form of a smartphone, a headset, or display terminal, for virtual reality, augmented reality, immersive video, or screen viewing. In addition, the player may have editing compatibilities to allow the user with user ID C to create a particular composite of the video and upload it to the server 502 for consumption by others. The player 518 accesses the server 502 through the user management module 510 and is granted permissions to view, download, and otherwise operate on video at the server.

The content hosting service 516 on the server 502 makes the combined content available for distribution by streaming or download by player devices 518. The content hosting service 516 may make a feed available that presents an ordered list of distribution content for playback, optionally using thumbnails on a graphical user interface presented on the player device 518. Player devices may optionally login to the user management module 510 to associate a User ID. This allows the server to identify content of interest to the particular player user, e.g., in a social media service. For example, the player user may have previously formed mutual connections with other users, in which one user invites another user to connect and the other user must accept for the connection to be formed. Alternatively, the player user may have followed other users.

The content hosting service 516 can use the User ID C of the player device 518 to allow access to uploaded takes and to present other content to the user that was created by one or more users whom the player user is connected to or follows. The content hosting service 516 can control access using permissions and associations. The content hosting service can differentiate between content in which the connected and/or followed user is the primary capture user vs. a secondary capture user. For example, priority in a content feed may be given to primary capture users whom the player user is connected to. A player user may also be a capture user, and may be presented by the content hosting service with a list of all content that the user participated in a capture session for. This content can be sorted into primary captures and secondary captures and various tags and flags may be added to the content to help guide the player user through the user interface. Additionally, a content feed can be pushed to the user to provide other distribution content related to the indicated interests of the player user, e.g., sports, cooking, education, music, etc.

Figure 6:
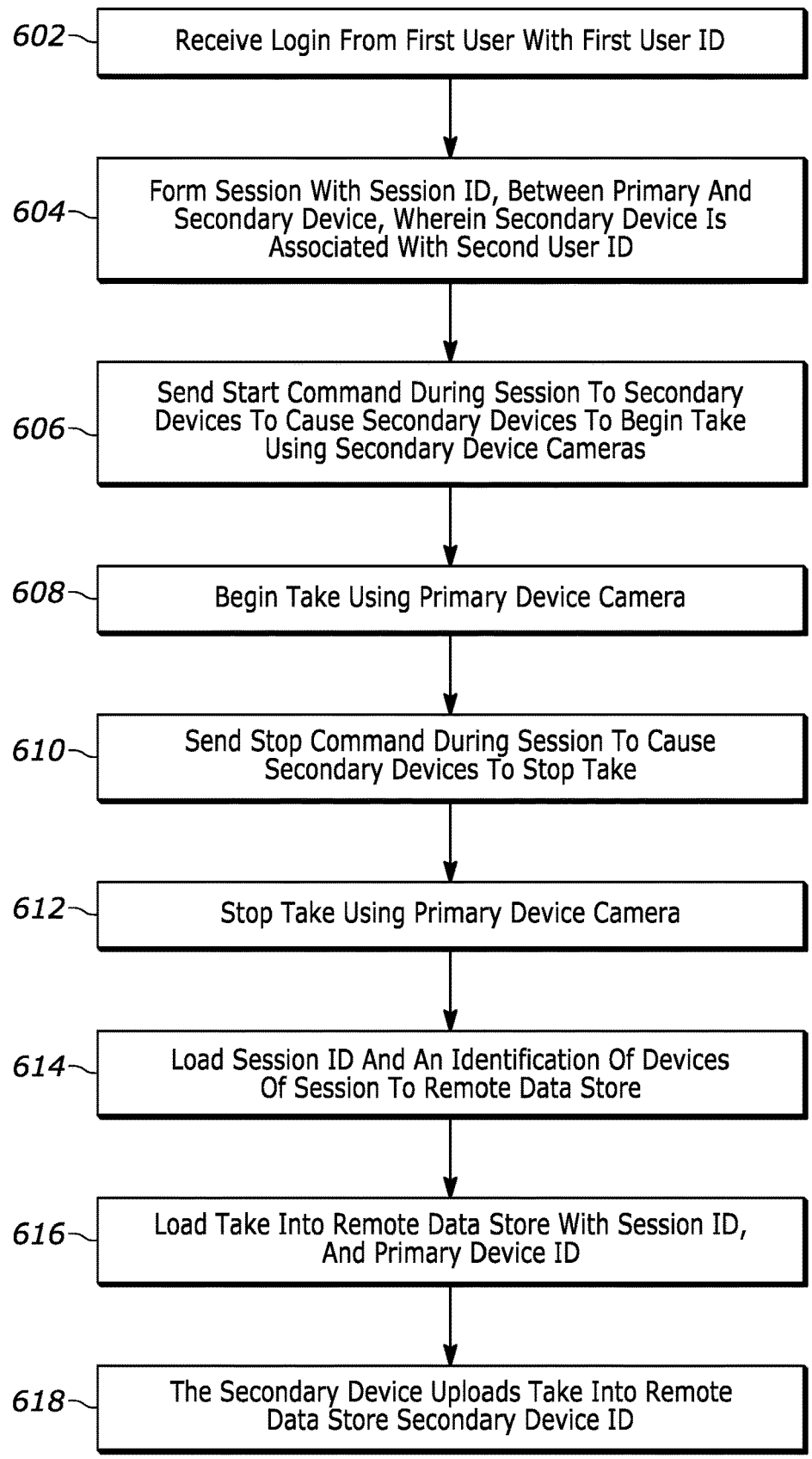
FIG. 6 is a process flow diagram of operations of a primary device according to embodiments herein.

FIG. 6 is a process flow diagram of operations of a primary device as described herein. In this method at 602 the primary device receives a login from a first user with a first user ID. This operation is optional and may be performed at an earlier time or automatically. At 604 a session is formed, with a session ID, between the primary device and a secondary device. Like the primary device, the secondary device is associated with a second user ID. The primary device may join many secondary devices to the session. The session may be formed in a variety of different ways. In alternative embodiments, the session is initiated by a server which then joins one capture device as the primary device and the other capture devices as secondary devices. As shown in FIG. 4, the session may be formed by sending an invitation to each of the secondary devices. The invitation having the first user ID for the primary device and the session ID. The primary device receives an acceptance from one or more of the secondary devices. The acceptances include the corresponding second user ID and secondary device ID.

The primary device has a primary device ID, a camera, and a communications interface to communicate with secondary devices. A first user ID is also registered with the primary device. Similarly, the secondary devices each have a secondary device ID, a camera, and communications interface to communicate with the primary device. In some sessions, the first user ID for the primary device and the second user ID for one or more of the secondary devices are the same.

With a session established, the primary device is able to control video captures. These may be organized into takes, each with its own take ID. The take IDs may be assigned from the outset or a simple numerical sequence may be used. At 606 the primary device sends a start command to each of the secondary devices. In some embodiments, only some of the secondary devices are used for some of the takes. The start command causes the secondary devices to begin the take using their respective secondary device cameras. At 608 the primary device begins a take by using its own primary device camera. At 610 the take is stopped. The primary device sends a stop command to the secondary devices. The stop command causes the secondary devices to stop their respective takes. At 612 the primary device stops its own primary device camera. The start and stop commands may include the take ID so that the secondary devices can associate their takes with the corresponding take IDs.

With the take completed, the captured video can be uploaded to a remote data store. The remote data store may be a server or merely a storage location. The server may be local or remote. At 614 the primary device uploads the session ID and an identification of the devices of the session. This information about the session and the take prepares the remote data storage for the uploads of the captured video. The information may include the take ID and the device ID of each secondary device. The primary device may also upload user IDs for the secondary devices that participated in the session. A take may be uploaded immediately after the take is completed or all of the takes may be uploaded at the end of a session. In some embodiments, the takes are all stored. Each device then searches for a suitable connection to the remote data store such as a high-speed Internet connection and then uploads the takes opportunistically when a suitable connection is available.

At 616 the primary device loads one or more takes into the remote data store through its communication interface. The take includes the session ID, primary device ID and other information such as the take IDs for each captured video. At 618 the secondary devices also upload their takes into the remote data store with their device IDs, and the relevant take IDs. The usability of the captured video is improved by including more information in each upload including session IDs, take IDs, device IDs and metadata. The remote data store is able to store all of this information in association with the video captures. The additional data about the video may include time and optionally position of the capture device. Depth of the objects in the video as well as capture information such as camera type, focal length, focus distance, lens aperture, frame rate, lighting, applied effects and similar information may also be included.

The uploads or the upload process may be in response to an upload command from the primary device. The upload command is to cause the secondary devices to upload a take when a connection to the remote data storage is available. The primary and secondary device may be logged into the remote data storage during the upload or the devices may send captured video without first logging in, authenticating or performing any other such operations. As mentioned, the upload may occur during the session between the primary and secondary capture devices. The upload may happen as a take is happening or after the session is ended.

When the capture session is completed, the primary and secondary capture devices may have permissions to access the takes at the remote data store. The user IDs may be used as authentication to access the takes. The takes may also be processed at the remote data store as described in more detail below.

While the process is described as being between a primary device and one or more secondary devices, the session may further include a third device, with a third device ID, a camera, and a communications interface to communicate with the primary device. In such a case, sending the start command includes sending the start command to the third device to cause the third device to begin a take using the third device camera. Sending the stop command causes the third device to stop the take. The third device uploads the take into the remote data store through the third device communications interface with the third device ID.

Figure 7:
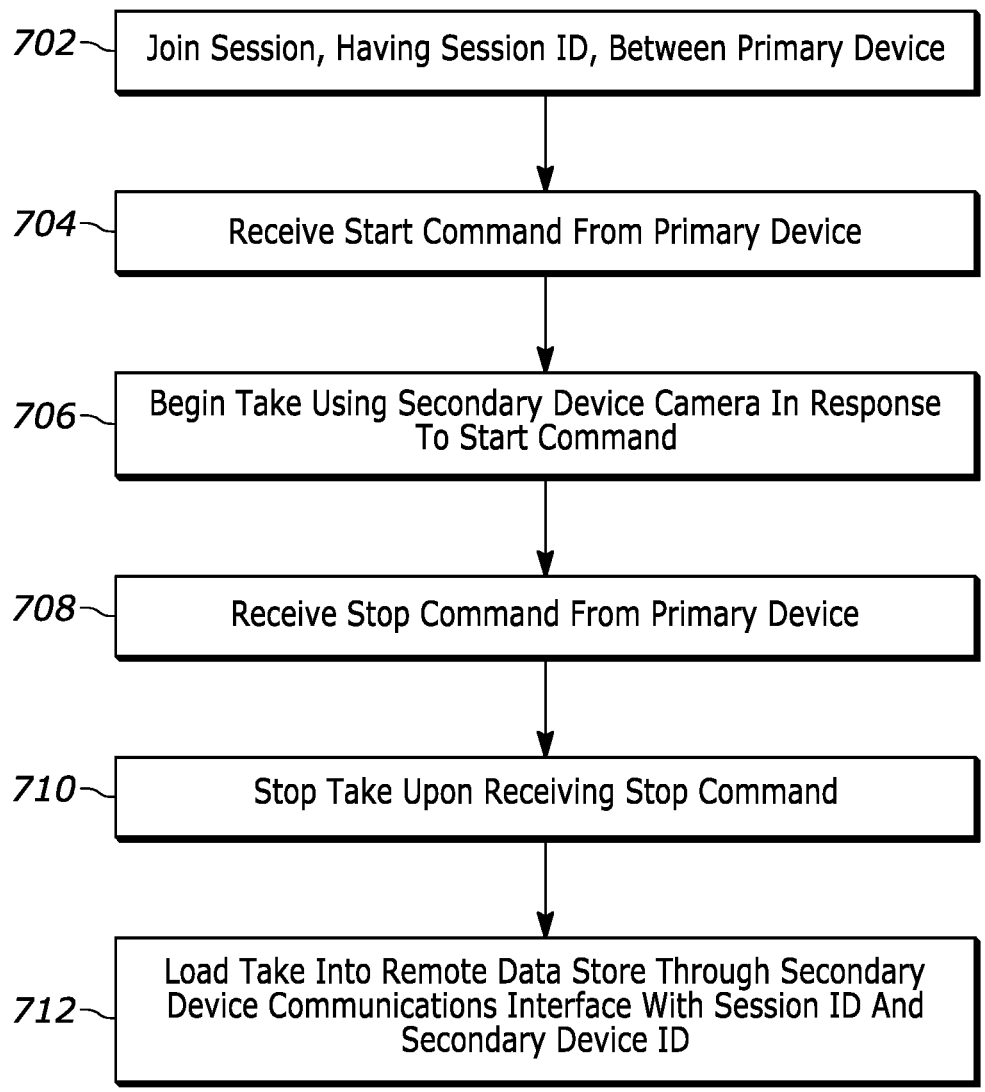
FIG. 7 is a process flow diagram of a process of video capture as performed by a secondary device according to embodiments herein.

FIG. 7 is a process flow diagram of a process of video capture as performed by a secondary device. At 702 the secondary device joins a session that includes a primary device. The session may be joined in different ways. In some embodiments, the secondary device receives an invitation with the first user ID and a session ID. The secondary device sends an acceptance in response that includes a second user ID and secondary device ID. The session has a session ID which the secondary device receives from the primary device. The primary device has a primary device ID, a camera, and a communications interface to communicate with the secondary device. The secondary device also has a secondary device ID, a camera, and a communications interface to communicate with the primary device. The primary device is associated with a first user ID and the secondary device is associated with a second user ID.

At 704 the secondary device receives a start command from the primary device. At 706 the secondary device begins a take using its secondary device camera in response to the start command. At 708 the secondary device receives a stop command from the primary device and, at 710, the secondary device stops the take upon receiving the stop command. There may be many more start and stop commands. Each command may include a take ID to identify each video capture.

At 712 the one or more takes are uploaded into the remote data store through the secondary device communications interface with the session ID and secondary device ID. The uploads may include take IDs and metadata as mentioned above. The uploading may be performed during the takes, during some takes or after all of the takes are completed. In some embodiments, the primary device sends an upload command to cause the secondary device to upload one or more takes in response to the upload command. The secondary device may login to the remote data store before uploading any takes, as mentioned before.

Figure 8:
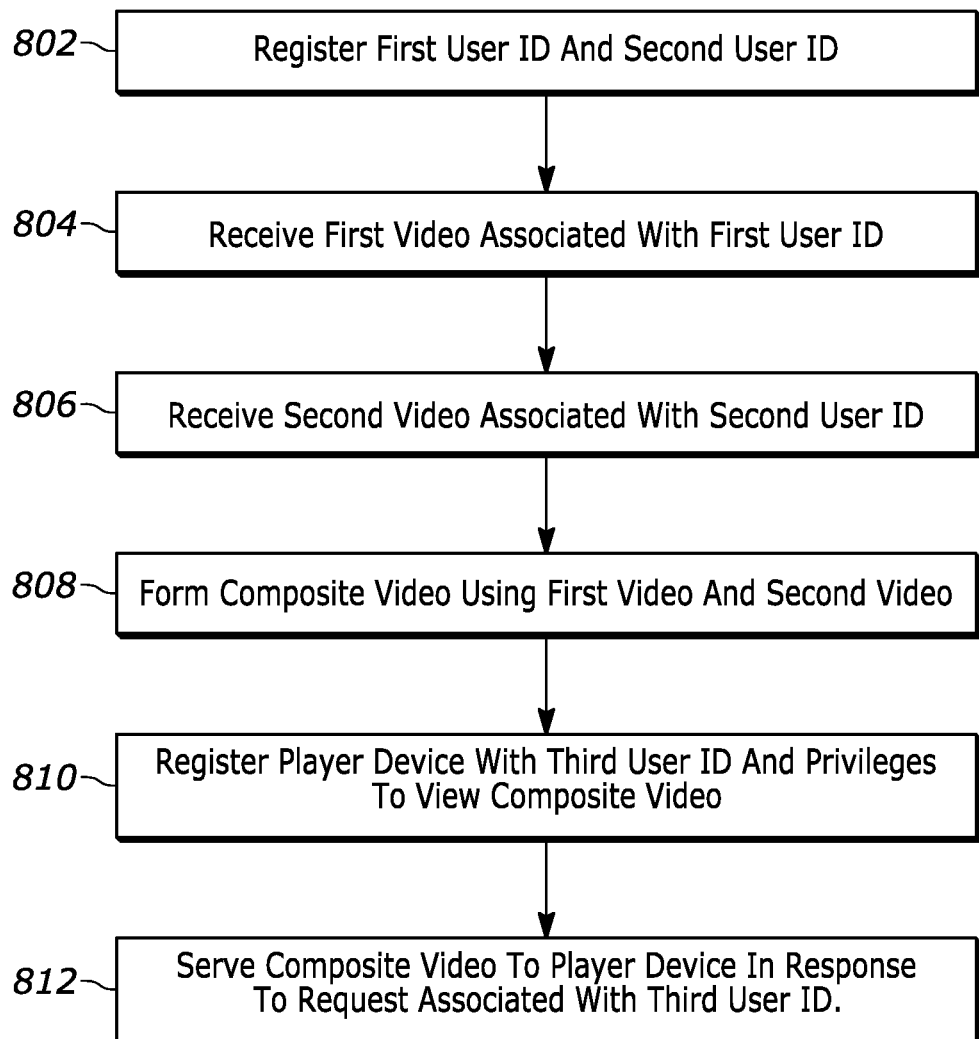
FIG. 8 is a process flow diagram of a process of video capture and content hosting performed by a server according to embodiments herein.

FIG. 8 is a process flow diagram of a process of video capture and content hosting performed by a server. This process begins at 802 with registering a first user ID and a second user ID. This registration may be done in a separate process and many more user IDs may be registered. Each registration may include related device IDs, permissions, preferences, and settings. In some embodiments a user may follow another user to be notified of new video captures, recommendations, tags and other content and notifications from the other user. In some embodiments, a user may grant or deny permissions to see particular video captures. The user IDs may be managed in the user management module of the server. The user IDs may be linked with permissions and access to video captures. The server session management of the user management may also establish sessions between various users for content sharing and video captures.

At 804 the server receives a first video associated with the first user ID and, at 806, the server receives a second video associated with the second user ID. These videos may include one or more takes and include metadata, such as time, position, and other information as mentioned above.

In embodiments, the server receives a session ID and an identification of devices of the session from the primary device, e.g., the device associated with the first user ID. The first and second videos may include the session ID, take IDs, device IDs and other information for use by the server. When the server has received the session information from the primary device, then this information may be used by the server to determine that all expected video capture files for the session have been uploaded successfully and received at the server.

In some embodiments, the server receives user-defined session information. This may include a user-defined name of the session, a creation time of the session, and names and device ID for each capture device in the session. In some embodiments, the server establishes the session and determines the participants and the naming for session ID, take IDs, and other information.

At 808 a composite video is formed using the first video and the second video. In some embodiments, there may be more than just two videos. The forming or compositing of the video may be done in a content preparation module of the server or another special dedicated video processing resource.

At 810 a player or player device is registered with a third user ID and privileges to view the composite video. The player may be registered in another earlier process before the video is received and assembled. At 812 the composite video is served to the player in response to a request received from the player and associated with the third user ID. The player may be the same type of device as the capture devices or it may be a different device including a headset or immersive video display system.

The content preparation service of the server, which may be implemented in a content preparation module processes the available uploaded capture files to form combined content. This content is referred to herein as composite content in that it may combine content from multiple devices that were participating in the video capture session. In some embodiments the combined content is a composite video in which a region of a picture contains the first input video and a second region of the same picture contains the second input video. More videos may be added to provide other regions. In another embodiment, the first input video is coded in pictures of the base layer, and the second input video is coded in pictures of another layer of the total composite video. In some embodiments, the combined content is an immersive video with multiple input videos of a 3D scene and camera parameters that are associated with each input video. These may be combined using patches and atlases from the video metadata. The player may be configured to allow playback navigation and show different views and perspectives based on position and orientation in multiple degrees of freedom. Audio as captured at each capture device may also be added to the composite to provide greater realism to the view of a particular capture device.

The content hosting module of the server may be regulated by the user management module. As mentioned above, multiple users may be registered to the user management module of the server. In some embodiments, the user management module maintains a list of user IDs for which the third user ID has a follower relationship or any other type of connection or relationship. When the third user logs in, the associated device, a player device in this example, may be presented with a list of user IDs. The list of user IDs is based on permissions maintained by the user management module. The third user may be able to rank certain other user IDs or provide other preferences. The user may then use the player device to send a selection of one or more user IDs to the server. The server receives the selection of the user ID from the list of user IDs and presents one or more composite videos that are associated with the selected user ID.

The user management module may register additional user IDs beyond the three mentioned here. Each of these may be linked to one or more of the other user IDs. As an example, additional user IDs may be linked to the first user ID. The links may then be used to control access to the composite video by any one of the other user IDs. Once a user ID is authenticated and the permissions are confirmed, then the content hosting module serves the requested composite video in any one or more of the forms above. Typically, the first user ID provides access to any composite video that involves the first user so that the server serves the composite video from a session with the primary device to the primary device associated with the first ID. Typically access to the composite video is permitted to all of the captured devices that were involved in the corresponding session. However, many different and other permissions may be implemented.

While the steps described herein may be performed under the control of a programmed processor, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the methods described herein may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present description includes various steps, which may be performed by hardware components or may be embodied in machine-readable instructions, such as software or firmware instructions. The machine-readable instructions may be used to cause a general-purpose or special-purpose processor programmed with the instructions to perform the steps. Alternatively, the steps may be performed by a combination of hardware and software.

The described operations may be provided as a computer program product that may include a machine-readable medium having stored instructions thereon, which may be used to program a computer (or other machine) to perform a process according to the present invention. The machine-readable medium may include, but is not limited to optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Some embodiments described herein pertain to a non-transitory machine-readable medium comprising a plurality of instructions, executed on a computing device, to facilitate the computing device to perform one or more of any of the operations described in the various embodiments herein.

Although this disclosure describes some embodiments in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

Embodiments presented above may be described in terms of a variety of examples. The examples include features that may or may not be required and the order of the features may be modified to suit particular uses of the embodiments.

An example relates to a method comprising: receiving a login to a primary device from a first user with a first user ID; forming a session, having a session ID, between the primary device and a secondary device, wherein the secondary device is associated with a second user ID, wherein the primary device has a primary device ID, a camera, and a communications interface to communicate with the secondary device and the secondary device has a secondary device ID, a camera, and a communications interface to communicate with the primary device; sending a start command during the session from the primary device to the secondary device to cause the secondary device to begin a take using the secondary device camera; beginning the take using the primary device camera upon sending the start command to the secondary device; sending a stop command during the session from the primary device to the secondary device to cause the secondary device to stop the take; stopping the take using the primary device camera upon sending the stop command to the secondary device; loading the session ID and an identification of the devices of the session to a remote data store from the primary device through the primary device communications interface; uploading the take at the primary device into the remote data store through the primary device communications interface with the session ID, and the primary device ID; and the secondary device uploading the take of the secondary device camera into the remote data store through the secondary device communications interface with the secondary device ID.

Another example includes sending an upload command from the primary device to the secondary device to cause the secondary device to upload the take to the remote data store.

In another example uploading the take at the primary device comprises searching for an Internet connection to the remote data store and uploading the take using the Internet connection.

Another example includes logging the primary device into the remote data store with the first user ID and the secondary device being logged into the remote data store with the second user ID.

In another example the take has a take ID and sending the start command includes sending the take ID and sending the stop command comprises sending the take ID.

In another example uploading the take at the primary device includes sending the first user ID.

In another example uploading the take at the primary device includes sending the session ID, the take ID, the primary device ID and the first user ID.

In another example uploading an identification of the devices includes uploading a device ID and user ID for each device of the session.

Another example includes accessing the take at the remote data store using the first user ID.

In another example the session further includes a third device having third device ID, a camera, and a communications interface to communicate with the primary device. Sending the start command includes sending the start command to the third device to cause the third device to begin a take using the third device camera, and sending the stop command causes the third device to stop the take. The third device uploads the take into the remote data store through the third device communications interface with the third device ID.

Another example includes sending the first user ID to the remote data store from the primary device during the session, and the secondary device sending the second user ID to the remote data store during the session.

Another example includes receiving a composite of the take from the remote data store at a device that is registered with a respective user ID.

In another example the composite of the take includes takes from the secondary device and at least one other device that is in the session.

In another example the take from the primary device is a video.

In another example the take includes additional data about the video including time and optionally position and the composite of the take is generated using the additional data.

In another example the take includes additional data about the video including depth of objects in the video and the composite of the take is generated using the additional data.

In another example forming a session includes forming a session with the remote data store.

In another example forming a session includes forming a session between the first user ID and the second user ID and uploading the take into the remote data store includes uploading the take after an end of the session.

In another example beginning a take includes beginning a video capture, the method further comprising uploading the video capture to the remote data store during the video capture.

In another example forming the session includes sending an invitation to the secondary device, the invitation having the first user ID and the session ID, and receiving an acceptance from the secondary device, the acceptance including the second user ID and the secondary device ID.

In another example the first user ID and the second user ID are the same, the method further comprising uploading the take from the primary device into the remote data store with the take ID and the primary device ID.

Another example includes sending an upload command to the secondary device, the upload command including the take ID, to cause the secondary device to upload the take associated with the take ID into the remote data store with the take ID.

In another example sending the start command includes sending the start command through a personal area network interface to communicate with the secondary device and uploading the take into the remote data store includes uploading the take through a wide area network interface to communicate with the remote data store.

An example relates to a video capture device that includes a session manager to receive a login from a first user with a first user ID and to form a session, having a session ID, with a secondary device, wherein the secondary device is associated with a second user ID, wherein the video capture device has a primary device ID, a camera, and a communications interface to communicate with the secondary device and the secondary device has a secondary device ID, a camera, and a communications interface to communicate with the primary device; a communications interface to send a start command during the session from the video capture device to the secondary device to cause the secondary device to begin a take using the secondary device camera, and to send a stop command during the session to the secondary device to cause the secondary device to stop the take; the camera to begin the take upon sending the start command and to stop the take upon sending the stop command to the secondary device; and a storage to store the take with the session ID and the primary device ID, the communications interface further to upload the session ID and an identification of the devices of the session to a remote data store and to upload the take at the primary device into the remote data store with the session ID, and the primary device ID, and the secondary device uploading the take into the remote data store through the secondary device communications interface with the secondary device ID.

Another embodiment includes sending an upload command to the secondary device to cause the secondary device to upload the take to the remote data store.

In another example the communications interface is further to search for an Internet connection to the remote data store and upload the take using the Internet connection.

In another example the communications interface is further to log the device into the remote data store with the first user ID.

In another example the take has a take ID and sending the start command includes sending the take ID and sending the stop command includes sending the take ID.

In another example uploading the take at the primary device includes sending the first user ID.

In another example uploading the take at the primary device includes sending the session ID, the take ID, the primary device ID and the first user ID.

In another example uploading an identification of the devices includes uploading a device ID and user ID for each device of the session.

In another example the communications interface is further to access the take at the remote data store using the first user ID.

In another example the communications interface is further to receive a composite of the take from the remote data using the first user ID.

In another example the camera is a video camera and the camera further records additional data about the video including time, position, orientation, and depth of objects in the video and the communications interface uploads the additional data to the remote data store.

In another example the session manager forms the session between the first user ID and the second user ID and the communications interface uploads the take into the remote data store after an end of the session.

In another example the session manager forms the session between the first user ID and the second user ID and the communications interface uploads the take into the remote data store during the session.

In another example the session manager is further to form a session with the remote data store.

In another example the communications interface is further to send an upload command to the secondary device, the upload command including a take ID, to cause the secondary device to upload a take associated with the take ID into the remote data store with the take ID.

In another example the communications interface is further to send the start command through a personal area network interface to communicate with the secondary device and uploads the take into the remote data store through a wide area network interface to communicate with the remote data store.

An example relates to a method that includes joining a session, having a session ID, between a primary device and a secondary device, wherein the secondary device is associated with a second user ID, wherein the primary device has a primary device ID, a camera, and a communications interface to communicate with the secondary device and the secondary device has a secondary device ID, a camera, and a communications interface to communicate with the primary device; receiving a start command during the session from the primary device at the secondary device; beginning a take at the secondary device using the secondary device camera in response to the start command; receiving a stop command during the session from the primary device at the secondary device; stopping the take using the secondary device camera upon receiving the stop command; and loading the take at the secondary device into a remote data store through the secondary device communications interface with the session ID and the secondary device ID in association with the session ID and an identification of the devices of the session at the remote data store.

Another example includes receiving an upload command from the primary device at the secondary device and uploading the take is in response to receiving the upload command.

In another example uploading the take includes searching for an Internet connection to the remote data store and uploading the take using the Internet connection.

Another example includes logging the secondary device into the remote data store with the second user ID before uploading the take.

In another example the take has a take ID and receiving the start command includes receiving the take ID and receiving the stop command includes receiving the take ID.

In another example uploading the take at the secondary device includes sending the session ID, the take ID, the secondary device ID and the second user ID.

Another example includes accessing the take at the remote data store using the second user ID.

In another example the take includes additional data about the video including time and optionally position and a composite of the take is generated using the additional data.

In another example the take includes additional data about the video including depth of objects in the video and the composite of the take is generated using the additional data.

In another example joining a session includes joining a session with the remote data store.

In another example joining a session includes joining a session between the first user ID and the second user ID and uploading the take into the remote data store includes uploading the take after an end of the session.

Another example includes sending the second user ID to the remote data store from the secondary device during the session.

In another example beginning a take includes beginning a video capture, the method further includes uploading the video capture to the remote data store during the video capture.

In another example joining the session further includes receiving an invitation at the secondary device, the invitation having the first user ID and the session ID, and sending an acceptance from the secondary device, the acceptance including the second user ID and the secondary device ID.

An example relates to a video capture device that includes a session manager to join a session, having a session ID, between a primary device and a secondary device, the secondary device is associated with a second user ID, the primary device has a primary device ID, a camera, and a communications interface to communicate with the secondary device and the secondary device has a secondary device ID, a camera, and a communications interface to communicate with the primary device; a communications interface to receive a start command during the session from the primary device to cause the secondary device to begin a take at the secondary device and to receive a stop command during the session from the primary device; a camera to begin the take in response to receiving the start command and to stop the take upon receiving the stop command; and the communications interface further to upload the take into a remote data store with the session ID and the secondary device ID in association with the session ID and an identification of the devices of the session at the remote data store.

In another example, the communications interface is further to receive an upload command from the primary device wherein uploading the take is in response to receiving the upload command.

In another example uploading the take includes searching for an Internet connection to the remote data store and uploading the take using the Internet connection.

In another example the session manager is further to log the device into the remote data store with the second user ID before uploading the take.

In another example the take has a take ID and receiving the start command includes receiving the take ID and receiving the stop command includes receiving the take ID.

In another example the communications interface uploads the take with the session ID, the take ID, the secondary device ID and the second user ID.

In another example the communications interface further accesses the take at the remote data store using the second user ID.

In another example the take includes additional data about the video including time and optionally position and a composite of the take is generated using the additional data.

In another example the take includes additional data about the video including depth of objects in the video and the composite of the take is generated using the additional data.

In another example the session manager is further to join a session with the remote data store.

In another example joining a session includes joining a session between the first user ID and the second user ID and uploading the take into the remote data store includes uploading the take after an end of the session.

In another example the session manager is further to send the second user ID to the remote data store during the session.

In another example beginning a take includes beginning a video capture, the communications interface is further to upload the video capture to the remote data store during the video capture.

In another example the session manager is further to receive an invitation, the invitation having the first user ID and the session ID, and the session manager sends an acceptance including the second user ID and the secondary device ID.

An example pertains to a method that includes registering a first user ID and a second user ID; receiving a first video associated with the first user ID, the first video including metadata regarding time and optionally position; receiving a second video associated with the second user ID, the second video including metadata regarding time and optionally position; forming a composite video using the first video and the second video; registering a player device with a third user ID and privileges to view the composite video; and serving the composite video to the player device in response to a request associated with the third user ID.

Another example includes maintaining a list of user IDs for which the third user ID has a follower relationship; presenting the list of user IDs to the player device upon receiving a request from the player device; receiving a selection of a user ID from the list of user IDs; and presenting a composite video associated with the selected user ID.

In another example presenting the composite video includes presenting a composite video in which the selected user ID is associated with a primary capture device of the composite video.

In another example serving the composite video includes sending a stream during receiving the first video and receiving the second video.

Another example includes authenticating a primary device to the first user ID; and serving the composite video to the primary device associated with the first user ID.

Another example includes associating the first video with the first user ID and associating the second video with the second user ID. The method includes controlling access to the composite video based on the first user ID and the second user ID.

Another example includes registering additional user IDs; linking the additional user IDs to the first user ID; and controlling access to the composite video based on the linking.

Another example includes forming a session, having a session ID, between a first device associated with the first user ID and a second device associated with the second user ID.

Another example includes receiving a session ID and an identification of the devices of the session from a primary device associated with the first user ID, receiving the first video includes receiving the session ID and receiving the second video includes receiving the session ID.

Another example includes using the identification of the devices of the session to determine that all expected files for the session have been uploaded successfully.

Another example includes receiving a user-defined name of the session, a creation time of the session, and a name and a device ID for each capture device in the session.

Another example includes a content preparation service on the server to process the available uploaded capture files to form combined content that combines content from multiple devices.

In another example the combined content includes a composite video in which a region of a picture contains a first input video and a second region of the picture contains a second input video.

In another example the first input video is coded in pictures of a base layer, and the second input video is coded in pictures of another layer.

In another example the combined content includes immersive video with multiple input videos of a 3D scene and camera parameters associated with each input video, combined using patches and atlases.

In another example the combined content includes immersive video that allows the player device to navigate playback with 6 degrees of freedom (DoF) of position and orientation.

In another example the content preparation service combines audio from multiple users, to form spatial audio.

In another example the content preparation service generates text overlays and adds the text overlays to the composite video.

Another example includes associating combined content files with a list of users participating in a capture session.

An example relates to a content hosting server that includes a user management module to register a first user ID, to register a second user ID, and to register a player device with a third user ID and privileges to view a composite video; a content hosting module to receive a first video associated with the first user ID, the first video including metadata regarding time and optionally position, to receive a second video associated with the second user ID, the second video including metadata regarding time and optionally position, and to serve the composite video to the player device in response to a request associated with the third user ID; and a content preparation module to form the composite video using the first video and the second video.

In another example the user management module is further to maintain a list of user IDs for which the third user ID has a follower relationship; present the list of user IDs to the player device upon receiving a request from the player device; and receive a selection of a user ID from the list of user IDs; and In another example the content hosting module is further to present a composite video associated with the selected user ID.

In another example presenting the composite video includes presenting a composite video in which the selected user ID is associated with a primary capture device of the composite video.

In another example the content hosting module serves the composite video by sending a stream during receiving the first video and receiving the second video.

In another example the user management module is further to authenticate a primary device to the first user ID, and the content hosting module is further to serve the composite video to the primary device associated with the first user ID.

In another example the user management module is further to associate the first video with the first user ID, associate the second video with the second user ID, and control access to the composite video based on the first user ID and the second user ID.

In another example the user management module is further to register additional user IDs, link the additional user IDs to the first user ID, and control access to the composite video based on the linking.

In another example the user management module is further to form a session, having a session ID, between a first device associated with the first user ID and a second device associated with the second user ID.

In another example the content hosting module is further to receive a session ID and an identification of the devices of the session from a primary device associated with the first user ID, and receiving the first video includes receiving the session ID and receiving the second video includes receiving the session ID.

In another example the content hosting module is further to use the identification of the devices of the session to determine that all expected files for the session have been uploaded successfully.

In another example the content hosting module is further to receive a user-defined name of the session, a creation time of the session, and a name and a device ID for each capture device in the session.

In another example the content preparation module is further to process the available uploaded capture files to form combined content that combines content from multiple devices.

In another example the combined content includes a composite video in which a region of a picture contains a first input video and a second region of the picture contains a second input video.

In another example the first input video is coded in pictures of a base layer, and the second input video is coded in pictures of another layer.

In another example the combined content includes immersive video with multiple input videos of a 3D scene and camera parameters associated with each input video, combined using patches and atlases.

In another example the combined content includes immersive video that allows the player device to navigate playback with 6 degrees of freedom (DoF) of position and orientation.

In another example the content preparation module is further to combine audio from multiple users, to form spatial audio.

In another example the content preparation module is further to generate text overlays and adds the text overlays to the composite video.

In another example the user management module is further to associate combined content files with a list of users participating in a capture session.

An example relates to an apparatus comprising a machine-readable medium having instructions stored thereon that when operated on by one or more processors cause the machine to perform operations comprising the methods of any one or more of the above examples.

An example relates to an apparatus comprising means for performing the operations of any one or more of the above examples.

An example relates to an apparatus comprising at least one processor and a memory having instructions for causing the processor to perform operations comprising the methods of any one or more of the above examples.

What is claimed is:

1. A method comprising:
    registering a first user ID for a primary device, a second user ID for a secondary device, and a session ID for a session between the primary device and the secondary device;
    forming the session having the session ID between the primary device associated with the first user ID and the secondary device associated with the second user ID and associating the session ID with the primary device and the secondary device;
    receiving a first video associated with the first user ID and the session ID, the first video including metadata regarding time and position;
    receiving a second video associated with the second user ID and the session ID, the second video including metadata regarding time and position;
    forming a composite video using the first video and the second video;
    determining that all expected files for the session have been uploaded successfully using the identification of the devices of the session;
    registering a player device with a third user ID and privileges to view the composite video; and
    serving the composite video to the player device in response to a request associated with the third user ID.

2. The method of claim 1, further comprising controlling access to the composite video based on the first user ID and the second user ID.

3. The method of claim 2, further comprising:
    registering additional user IDs;
    linking the additional user IDs to the first user ID; and
    controlling access to the composite video based on the linking.

4. The method of claim 1, further comprising forming the composite video by:
    coding the first video in pictures of a base layer;
    coding the second video in pictures of another layer;
    generating text overlays; and
    adding the text overlays to the composite video.

5. An apparatus comprising a machine-readable medium having instructions stored thereon that when operated on by one or more processors cause the apparatus to perform operations comprising:
    registering a first user ID for a primary device, a second user ID for a secondary device, and a session ID for a session between the primary device and the secondary device;
    receiving a first video associated with the first user ID and the session ID, the first video including metadata regarding time and position;
    receiving a second video associated with the second user ID and the session ID, the second video including metadata regarding time and position;
    forming a composite video using the first video and the second video;
    registering a player device with a third user ID and privileges to view the composite video;
    serving the composite video to the player device in response to a request associated with the third user ID; and
    receiving a user-defined name of the session, a creation time of the session, and a name and a device ID for each device in the session after serving the composite video.

6. The apparatus of claim 5, the operations further comprising:

maintaining a list of user IDs for which the third user ID has a follower relationship;

presenting the list of user IDs to the player device upon receiving a request from the player device; and receiving a selection of a user ID from the list of user IDs;

wherein the content hosting module is further to present a composite video associated with the selected user ID.

7. The apparatus of claim 5, wherein forming a composite video comprises:

processing available uploaded capture files to form combined content that combines content from multiple devices in which a region of a picture contains a first input video, and a second region of the picture contains a second input video.

8. A method comprising:

registering a first user ID for a primary device;

registering a second user ID for a secondary device;

registering a session ID for a session between the primary device and the secondary device;

registering a player device with a third user ID and privileges to view a composite video;

receiving a first video associated with the first user ID and the session ID, the first video including metadata regarding time and position;

receiving a second video associated with the second user ID and the session ID, the second video including metadata regarding time and position;

forming a composite video using the first video and the second video;

serving the composite video to the player device in response to a request associated with the third user ID; and receiving a user-defined name of the session, a creation time of the session, and a name and a device ID for each device in the session after serving the composite video.

9. The method of claim 8, wherein the user management module is further to:

maintain a list of user IDs for which the third user ID has a follower relationship;

present the list of user IDs to the player device upon receiving a request from the player device; and receive a selection of a user ID from the list of user IDs; and wherein the content hosting module is further to present a composite video associated with the selected user ID.

10. The method of claim 8, wherein the selected user ID is associated with a selected device, the method comprising designating the selected device as a primary capture device of the composite video.

11. The method of claim 8, further comprising forming the session, having the session ID, between a first device associated with the first user ID and a second device associated with the second user ID.

12. The method of claim 8 further comprising determining that all expected files for the session have been uploaded using the first user ID and the second user ID of the session.

13. The method of claim 8, further comprising processing the first video and the second video to form combined content that combines content from multiple devices.

14. The method of claim 13, wherein the combined content comprises a composite video in which a region of a picture contains a first input video, and a second region of the picture contains a second input video.

15. The method of claim 14, wherein the first input video is coded in pictures of a base layer, and the second input video is coded in pictures of another layer.

16. The method of claim 14, wherein the combined content comprises immersive video with multiple input videos of a 3D scene and camera parameters associated with each input video, combined using patches and atlases.

17. The method of claim 14, wherein the combined content comprises immersive video that allows the player device to navigate playback with 6 degrees of freedom of position and orientation.

18. The method of claim 8, further comprising combining audio from multiple users, to form spatial audio.

19. The method of claim 8, further comprising generating text overlays and adding the text overlays to the composite video.

20. The method of claim 8, further comprising associating combined content files with a list of users participating in a capture session.

* * * * *